United States Patent
Watkiss et al.

(10) Patent No.: US 10,951,642 B2
(45) Date of Patent: *Mar. 16, 2021

(54) CONTEXT-DEPENDENT TIMEOUT FOR REMOTE SECURITY SERVICES

(71) Applicant: Sophos Limited, Abingdon (GB)

(72) Inventors: Neil Robert Tyndale Watkiss, Oxford (GB); Emile Marcus Kenning, Abingdon (GB); Mark David Harris, Oxon (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,057

(22) Filed: Jan. 13, 2020

(65) Prior Publication Data

US 2020/0153849 A1 May 14, 2020

Related U.S. Application Data

(63) Continuation of application No. 15/970,814, filed on May 3, 2018, now Pat. No. 10,594,717.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1416* (2013.01); *H04L 63/1433* (2013.01); *H04L 63/20* (2013.01)

(58) Field of Classification Search
CPC .............. H04L 63/1425; H04L 63/1416; H04L 63/1433; H04L 63/20; G06N 20/00
See application file for complete search history.

(56) References Cited

U.S. PATENT DOCUMENTS

| | | | |
|---|---|---|---|
| 7,966,643 B2 | 6/2011 | Nagampalli et al. | |
| 8,607,347 B2 * | 12/2013 | Harris | G06F 21/565 726/24 |
| 9,032,498 B1 * | 5/2015 | Ben Ayed | H04W 12/0608 726/9 |
| 9,967,267 B2 * | 5/2018 | Ladnai | H04L 63/20 |
| 2007/0106599 A1 | 5/2007 | Hochberg et al. | |
| 2011/0078333 A1 | 3/2011 | Jakubowski | |

(Continued)

FOREIGN PATENT DOCUMENTS

WO WO-2019211592 11/2019

OTHER PUBLICATIONS

USPTO, "U.S. Appl. No. 15/970,814 Non-Final Office Action dated Oct. 10, 2019", 11 pages.

(Continued)

*Primary Examiner* — Ghodrat Jamshidi
(74) *Attorney, Agent, or Firm* — Strategic Patents, P.C.

(57) ABSTRACT

A threat management facility that remotely stores global reputation information for network content can be used in combination with a recognition engine such as a machine learning classifier that is locally deployed on endpoints within an enterprise network. More specifically, the recognition engine can locally evaluate reputation for a network address being accessed by an endpoint, and this reputation information can be used to dynamically establish a timeout for a request from the endpoint to the threat management facility for corresponding global reputation information.

20 Claims, 7 Drawing Sheets

(56) References Cited

U.S. PATENT DOCUMENTS

| | | |
|---|---|---|
| 2011/0173683 A1 | 7/2011 | Roach |
| 2011/0191849 A1 | 8/2011 | Jayaraman et al. |
| 2012/0110667 A1 | 5/2012 | Zubrilin et al. |
| 2012/0324094 A1* | 12/2012 | Wyatt ................ H04L 43/0876 709/224 |
| 2014/0331322 A1* | 11/2014 | Jaroch ..................... G06F 21/56 726/23 |
| 2015/0026567 A1 | 1/2015 | Bots et al. |
| 2015/0033341 A1 | 1/2015 | Schmidtler et al. |
| 2015/0312267 A1 | 10/2015 | Thomas |
| 2016/0021056 A1 | 1/2016 | Chesla |
| 2016/0078225 A1 | 3/2016 | Ray et al. |
| 2016/0173510 A1 | 6/2016 | Harris et al. |
| 2016/0173525 A1 | 6/2016 | Thomas et al. |
| 2016/0234231 A1* | 8/2016 | Stan ........................ G06F 9/542 |
| 2016/0330245 A1 | 11/2016 | Bell et al. |
| 2016/0337309 A1 | 11/2016 | Saiyed et al. |
| 2017/0324709 A1 | 11/2017 | Ahn et al. |
| 2018/0255092 A1* | 9/2018 | Thubert .............. H04L 61/1511 |
| 2018/0375877 A1* | 12/2018 | Jakobsson ............. G06F 16/955 |
| 2019/0007426 A1 | 1/2019 | Bergström |
| 2019/0342312 A1 | 11/2019 | Watkiss et al. |

OTHER PUBLICATIONS

USPTO, "U.S. Appl. No. 15/970,814 Notice of Allowance dated Nov. 7, 2019", 10 pages.

ISA, "PCT Application No. PCT/GB2019/051191 International Search Report and Written Opinion dated Aug. 7, 2019", 22 pages.

EPO, "PCT Application No. PCT/GB2019/051191 Invitation to Pay Additional Fees with Partial Search Report dated Jun. 14, 2019", 16 pages.

UKIPO, "UK Application No. 2018976.7 Examination Report dated Jan. 25, 2021", 3 pages.

* cited by examiner

CONTEXT-DEPENDENT TIMEOUT FOR REMOTE SECURITY SERVICES

CROSS-REFERENCE TO RELATED APPLICATIONS

This application is a continuation of U.S. patent application Ser. No. 15/970,814, filed May 3, 2018, with the entire contents of this application incorporated hereby incorporated herein by reference.

This application is related to the following commonly-owned U.S. patent application hereby incorporated herein by reference in its entirety: U.S. patent application Ser. No. 15/970,825 filed on May 3, 2018, and entitled "Method for Conditionally Hooking Endpoint Processes with a Security Agent."

BACKGROUND

Enterprise networks can contain valuable information that forms an increasingly attractive target for malicious actors. There remains a need for improved techniques to locally manage the security of processes executing on an endpoint, particularly where the endpoint regularly interacts with external content and services, or seeks to download and execute content from remote sources.

SUMMARY

A variety of techniques are employed to locally secure endpoints in the context of an enterprise network and remote network resources.

A threat management facility that remotely stores global reputation information for network content can be used in combination with a recognition engine such as a machine learning classifier that is locally deployed on endpoints within an enterprise network. More specifically, the recognition engine can locally evaluate reputation for a network address being accessed by an endpoint, and this reputation information can be used to dynamically establish a timeout for a request from the endpoint to the threat management facility for corresponding global reputation information.

In one aspect, a computer program product disclosed herein may include computer executable code embodied on a non-transitory computer readable medium that, when executing on an endpoint, performs the steps of intercepting a request for content from a browser executing on an endpoint, the request including a uniform resource locator that identifies a recipient for the request on a data network, applying a machine learning classifier locally on the endpoint to estimate a risk associated with the uniform resource locator, transmitting a lookup request for the uniform resource locator from the endpoint to a remote threat management facility, determining a timeout for a response from the remote threat management facility to the lookup request based on the risk determined by the machine learning classifier, the timeout providing a window of limited duration for receiving the response at the endpoint, when the response is received within the window provided by the timeout, processing the request for content according to the response from the remote threat management facility, and when the response is not received within the window provided by the timeout, processing the request for content using a default local rule on the endpoint.

Processing the request for content may include blocking retrieval of the content. Processing the request for content may include scanning the content for malware. Processing the request for content may include executing the content.

In one aspect, a method disclosed herein may include monitoring network communications of an endpoint with a resource identified by a network address, applying a recognition engine locally on the endpoint to estimate a risk associated with the network communications, and modifying a security parameter on the endpoint in response to the risk associated with the network communications.

The risk may include a threat level. The risk may include a malware presence. The risk may include a reputation of the network address. The network address may include an internet protocol address. The network address may include a uniform resource locator. The network communications may include a request for content from the network address. Modifying the security parameter may include modifying a timeout for a remote request to a threat management facility for information about the network address. The network communications may include content retrieved from the network address. Modifying the security parameter may include modifying at least one of a data rate of retrieval of the content, an amount of the content to scan for malware, and a security policy for the endpoint. Modifying the security parameter may include at least one of selecting a sandbox to execute the content, specifying a scanning aggressiveness, and modifying a handling of the content. The recognition engine may include a machine learning classifier.

In one aspect, a system disclosed herein may include an endpoint security agent executing on an endpoint in an enterprise network, the endpoint security agent including a recognition engine for evaluating riskiness of a network address, and the endpoint security agent configured to determine a risk value for network communications of the endpoint containing the network address using the recognition engine, and to transmit the risk value and a security request for the network address to a remote resource for evaluation. The system may further include a threat management facility for the enterprise network, the threat management facility coupled in a communicating relationship with the endpoint and the threat management facility configured to respond to the security request based on the risk value.

The threat management facility may be configured to prioritize a response to the endpoint relative to one or more other requests from one or more other endpoints based upon the risk value. The network communications may include content retrieved from the network address, and the threat management facility may adjust a scanning of the content based on the risk value. The threat management facility may be configured to adjust the scanning by adjusting an amount of the content that is scanned. The threat management facility may be configured to adjust the scanning by adjusting a size of a library used to identify malware.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
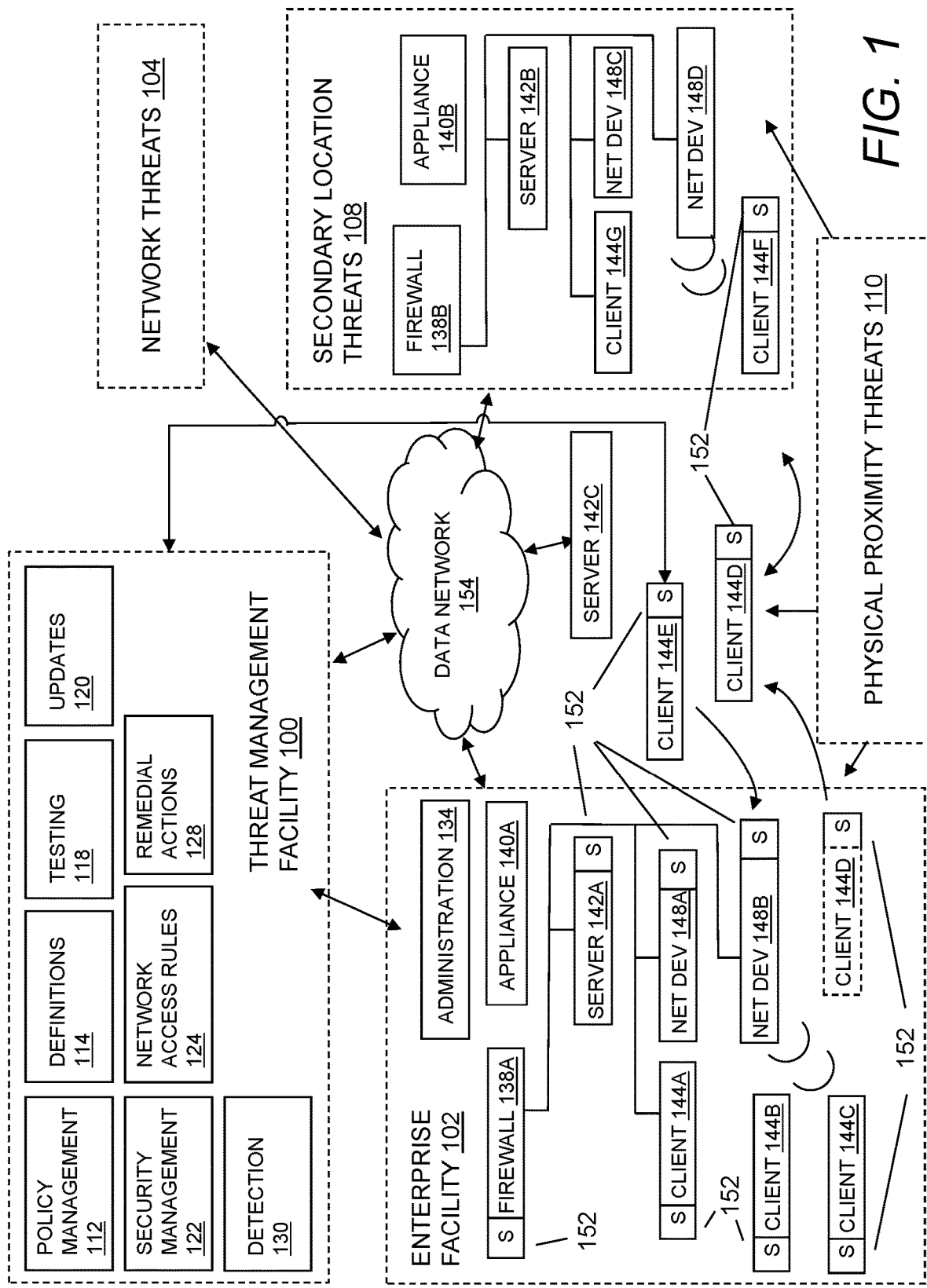
FIG. 1 illustrates an environment for threat management.

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Furthermore, each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

The phrase, "heterogeneous network," and similar terms or phrases as used herein, is intended to refer to networks containing or using various combinations of network devices, endpoints types, protocols, communications mediums, communications fabric, and so forth. For example, a heterogeneous network may include networks that connect devices that use different operating systems and/or protocols. A heterogeneous network may also or instead include different types of endpoints including virtual machines, mobile devices, desktop computers, servers, smart phones, and Internet-of-Things (IoT) devices such as smart appliances, smart speakers, cameras, physical security systems, physiological monitoring devices, and so forth. This can pose particular difficulties where, for example, different devices have different processing capabilities, network access interfaces and so forth. For example, certain devices may be configured for access through a web server that permits user access and configuration through a web-based interface but does not provide for programmatic access and control. Other devices may be configured for connection through short range RF interfaces and low-level device drivers running on a desktop or other network-connected device. Still other machines may be configured to connect to a wireless network through Wireless Protected Setup or any other proprietary or standardized protocol. Heterogeneous networks may also or instead include networks with different physical or logical configurations including, e.g., arrangements of access points, routers, switches, network address translation devices, gateways, firewalls, and so forth. Heterogeneous networks may also or instead include any number or configuration of remote devices accessing an enterprise network, e.g., through a virtual private network, cellular data connection, network server, cloud-based service, or the like. Heterogeneous networks may also or instead include network devices and endpoints from multiple different vendors.

In the context of a network containing a mixture of such endpoints, network devices, and other computing devices, it may be difficult or impossible to bring certain devices into compliance with a network policy. For example, it may be impossible to install a security agent on a smart appliance to ensure safe, malware-free local execution of software. As another example, device identification information may be lost as communications pass through a network address translation device or through a combination of different network devices from different vendors, thus rendering secure management of network communications among devices within the network, and with devices or services outside of an enterprise network, more challenging. Disclosed herein are a variety of techniques for securing endpoint operation and network communications in a heterogeneous network for an enterprise.

FIG. 1 illustrates an environment for threat management. Specifically, FIG. 1 depicts a block diagram of a threat management system providing protection to an enterprise against a plurality of threats—a context in which the following techniques may usefully be deployed. In general, a policy management facility 112 may be used to manage the policies for some or all of the corporate computing assets in the enterprise, and a threat management facility 100 may be used distribute such policies and to monitor compliance therewith. The threat management facility 100 may provide multiple security and management services instead of or in addition to policy management.

The threat management facility 100 may provide an enterprise facility 102 such as an enterprise network with protection from computer-based malware, including viruses, spyware, adware, Trojans, intrusion, spam, policy abuse, uncontrolled access, and the like. The enterprise facility 102 may, for example, be a facility including computer and network resources for any corporate, commercial, educational, or governmental enterprise or the like. The enterprise facility 102 may include a computer network, which may be at a single physical facility or distributed amongst a plurality of facilities and in a plurality of geographical locations. The enterprise facility 102 may include an administration system 134, a firewall 138A, an appliance 140A, a server 142A, network devices 148A-B, clients 144A-D, and the like. The aforementioned devices within the enterprise facility 102 may be protected by endpoint computer security facilities 152. It will be understood that any reference herein to client facilities may include the clients 144A-D shown in FIG. 1 and vice-versa.

The threat management facility 100 may provide a plurality of functions through components or platforms such as security management facility 122, a policy management facility 112, an update facility 120, a definitions facility 114, a network access rules facility 124, a remedial action facility 128, a detection techniques facility 130, a testing facility 118, a threat research facility 132, and the like. In embodiments, the threat management facility 100 may provide threat management functions beyond the network boundaries of the enterprise facility 102 to include, e.g., clients 144D connected to network resources that are not directly associated with or controlled by the enterprise facility 102. Threats to client facilities may come from a plurality of sources, such as from network threats 104, physical proximity threats 110, secondary location threats 108, and the like. Clients 144A-D may be protected from threats even when the located beyond the enterprise 102 facility, such as when a client 144E-F moves in and out of the enterprise facility 102, for example when interfacing with an unprotected server 142C through the data network 154, or when a client 144F is moving into an area posing secondary location threats 108 such as when interfacing with components 140B, 142B, 148C, 148D that are not protected.

The threat management facility 100 may operate as a stand-alone security solution, or the threat management facility 100 may be integrated into or cooperate with one or more third-party products such as commercial libraries of known vulnerabilities and exploits or commercial providers of virus definitions, remediations and so forth.

The security management facility 122 may be operable to scan clients 144A-D on machines operating within the enterprise facility 102, or clients 144E-F otherwise managed by the threat management facility 100, for malicious code, to remove or quarantine certain applications and files, to prevent certain actions, to perform remedial actions, and to perform other security measures. In embodiments, scanning the clients 144A-D and/or 144E-F may include scanning some or all of the files stored thereon at any suitable time(s). For example, this may include scanning on a periodic basis, scanning an application when the application is executed, scanning files as the files are transmitted to or from one of the clients 144A-F, or the like. The scanning of the applications and files may be performed to detect known malicious code or known unwanted applications. In general, new malicious code and unwanted applications are continually developed and distributed, and the known code database for the security management facility 122 may be updated on a periodic basis, on an on-demand basis, on an alert basis, or the like.

The security management facility 122 may provide email security to protect against spam, viruses, spyware and phishing, and the like, as well as management or control of email content. Email security and control may also or instead protect against inbound and outbound threats, protect email infrastructure, prevent data leakage, provide spam filtering, and the like. The security management facility 122 may also or instead provide web security, e.g., to help protect against exposure to viruses, spyware, malware, unwanted applications, and the like during web browsing activity, and to otherwise control or manage web browsing. Web security measures may include Internet use policies, reporting on suspect devices, security and content filtering, active monitoring of network traffic, URI filtering, and the like. The security management facility 122 may also or instead provide network access control, including control over network connections, e.g., to stop unauthorized, guest, or non-compliant systems from accessing networks through the enterprise facility 102, or to control network traffic into and out of the enterprise facility 102. This may also or instead include controlling access to virtual private networks (VPNs) that provide a communications network tunneled through another network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Behavioral protection, as distinguished from runtime protection, can advantageously identify malicious code at a gateway or file servers and delete the code before it can reach endpoint computers and the like.

The security management facility 122 may provide reputation filtering to target or identify sources of known malware. For instance, reputation filtering may use lists of URIs of known sources of malware or known suspicious IP addresses, or domains that, when detected, invoke an action by the threat management facility 100, such as dropping packets, terminating connections or taking other remedial action. By dropping the source before any interaction can occur, potential threat sources may be thwarted before any exchange of data can be made.

The policy management facility 112 may manage access rules and policies that are distributed throughout the enterprise facility 102 to manage and control use of network resources by client facilities 144A-F. The policies may be defined or organized by application type, application capabilities, organization hierarchy, computer facility type, user type, network location, time of day, connection type, and so forth. Policies may be maintained by the administration facility 134, through the threat management facility 100. For example, a policy may restrict IM activity to communications with customers by support personnel. In general, the policy management facility 112 may operate as a stand-alone application deployed within the enterprise 102 (e.g., as a service of the network server 142) or remotely as a cloud service, as an application on the client facilities 144A-F, or some combination of these.

The threat management facility 100 may provide configuration management services for managing the configuration of applications, operating systems, hardware, and the like on endpoints such as the client facilities 144A-F (in general, the terms endpoint, client, and client facility are used interchangeably herein unless a different meaning is explicitly provided or otherwise clear from the context). The threat management facility 100 may also provide for the removal of applications that potentially interfere with the operation of the threat management facility 100, such as competitor products that provide overlapping or conflicting threat management functions.

Threat management against a quickly evolving malware environment may require timely updates, and thus an update management facility 120 may be provided by the threat management facility 100 to update malware definitions, remediation software, rules, definitions and so forth. In addition, the policy management facility 112 may require update management (e.g., as provided by the update facility 120 herein described). The update management for the security management facility 122 and policy management facility 112 may be provided directly by the threat management facility 100, such as by a hosted system or in conjunction with the administration facility 134. In embodiments, the threat management facility 100 may provide patch management, e.g., for operating systems, applications, system tools and the like.

The threat management facility 100 may provide controlled access to the enterprise facility 102. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the enterprise facility 102 or may be on another network such as the data network 154. In an embodiment, the network access rules facility 124 may verify access rights for client facilities from within the enterprise facility 102 or may verify access rights of computer facilities from external networks. When network access for a client facility is denied, the network access rules facility 124 may send a data file to the client facility containing related information. The data file may contain a number of commands, definitions, instructions, or the like to be parsed and acted upon through the remedial action facility 128, or the like.

The network access rules facility 124 may include databases such as a block list, a black list, an allowed list, a white list, an unacceptable network site database, an acceptable network site database, a network site reputation database, or the like of network access locations that may or may not be accessed by the client facility. The network access rules facility 124 may also or instead include rules, application logic or the like for controlling network access according to network policies and the like. The network access rule facility 124 may provide updated rules and policies to the enterprise facility 102.

The detection facility 130 may be used to monitor activity and stored files on computing facilities, such as on server facilities 142, desktop computers, laptop computers, other mobile computing devices, and the like. The detection facility 130 may monitor the enterprise facility 102 network or endpoint devices, such as by monitoring streaming data through the gateway, across the network, through routers and hubs, and the like.

When a threat or policy violation is detected, e.g., by the detection facility 130 or more generally, by the threat management facility 100, the threat management facility 100 may perform or initiate a remedial action from the remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, recording interactions for subsequent evaluation, or the like. Remedial action may also or instead include modifications to network access rules in order to terminate or restrict network activity by affected devices. Remedial action may also or instead include deployment of remediation Remedial action may also or instead include a scan of affected software and/or endpoints. More generally any action or combination of actions suitable for managing or containing threats or potential threats may be used by the remedial action facility 128.

The testing facility 118 may allow the administration facility 134 to coordinate the testing of the security configurations of client facilities in the enterprise facility 102. For example, the administration facility 134 may send test files to a set of client facilities to test the security posture. After the test file has been transmitted, a recording facility may record the actions taken by each of the client facilities in reaction to the test file. The recording facility may aggregate testing information from the client facilities and report the testing information to the administration facility 134. The administration facility 134 in turn evaluate a level of preparedness of the client facilities based on the reported information. Where appropriate, remedial action may be initiated for any vulnerable or compromised client facilities as determined by the administration facility 134.

The threat management facility 100 may provide threat protection to the enterprise facility 102 including networked components such as client facility, server facility 142, administration facility 134, firewall 138, gateway, hubs and routers 148, threat management appliance 140 (which may be a stand-alone application or network device, or may be deployed within one or more of the firewalls, gateways, routers and so forth), desktop users, mobile users, and the like. A security agent located on each endpoint may also or instead provide threat protection to a user. The term endpoint, as used herein, may refer to a computer system that sources data, receives data, evaluates data, buffers data, or the like (such as a desktop computer, mobile device, server, or other computing device), a firewall as a data evaluation endpoint computer system, a laptop as a mobile endpoint computer, a personal digital assistant or tablet as a hand-held endpoint computer, a mobile phone as an endpoint computer, or the like. Thus, endpoints include the client facilities 144 and servers 142 described herein, as well as any other computing devices or the like coupled in a communicating relationship to the data network 154 and/or within the enterprise facility 102. The term endpoint may also or instead refer to a source or destination for data.

The enterprise facility 102 may include a plurality of servers 142, such as application servers, communications servers, file servers, database servers, proxy servers, mail servers, fax servers, game servers, web servers, and the like. A server 142 may include any machine or application that accepts client facility connections in order to service requests from clients 144. In one aspect, the server 142 may run on the same computer as a client facility 144 using it, or the server 142 and the client facility 144 may be running on different computers and communicating across the network. A server facility 142 may also be an appliance facility 140, where the appliance facility 140 provides specific services onto the network.

A client facility may be protected from threats from within the enterprise facility 102 using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed.

Another component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a source with a low level of trust is a data network 154 that includes a public network such as the Internet, and more particularly, unknown sources of data on the Internet. A perimeter network forms a zone with an intermediate trust level situated between the Internet and a trusted internal network. Since firewall facilities 138 may represent boundaries between threat levels (corresponding to boundaries between different networks), the security agent 152 associated with the firewall facility 138 may provide resources that control the flow of threats at this enterprise facility 102 network entry point. Firewall facilities 138, and associated security agents 152, may also be associated with a network node that is equipped for interfacing between networks that use different protocols. In embodiments, a security agent 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop security agent 152.

Client facilities within the enterprise facility 102 or outside the enterprise facility 102 may be connected to the enterprise facility 102 network by way of wired network facilities 148A or wireless network facilities 148B, or any combination of these. Within areas exposed to secondary location threats 108, there may be no security agents 152 at network components such as firewalls 138B, servers 142B, clients 144G, hubs and routers 148C-D, and the like. As a result, the computer components at such locations may be open to threat attacks, and become potential sources of threats. In this instance, these computer components may now unknowingly spread a threat to other components connected to the network, and it may be useful to track transitions into and of these secondary locations by devices associated with the enterprise facility 102 but connected to other network resources outside the enterprise facility 102.

Having provided an overall context for threat detection, the description now turns to a brief discussion of an example of a computer system that may be used for any of the entities and facilities described above.

Figure 2:
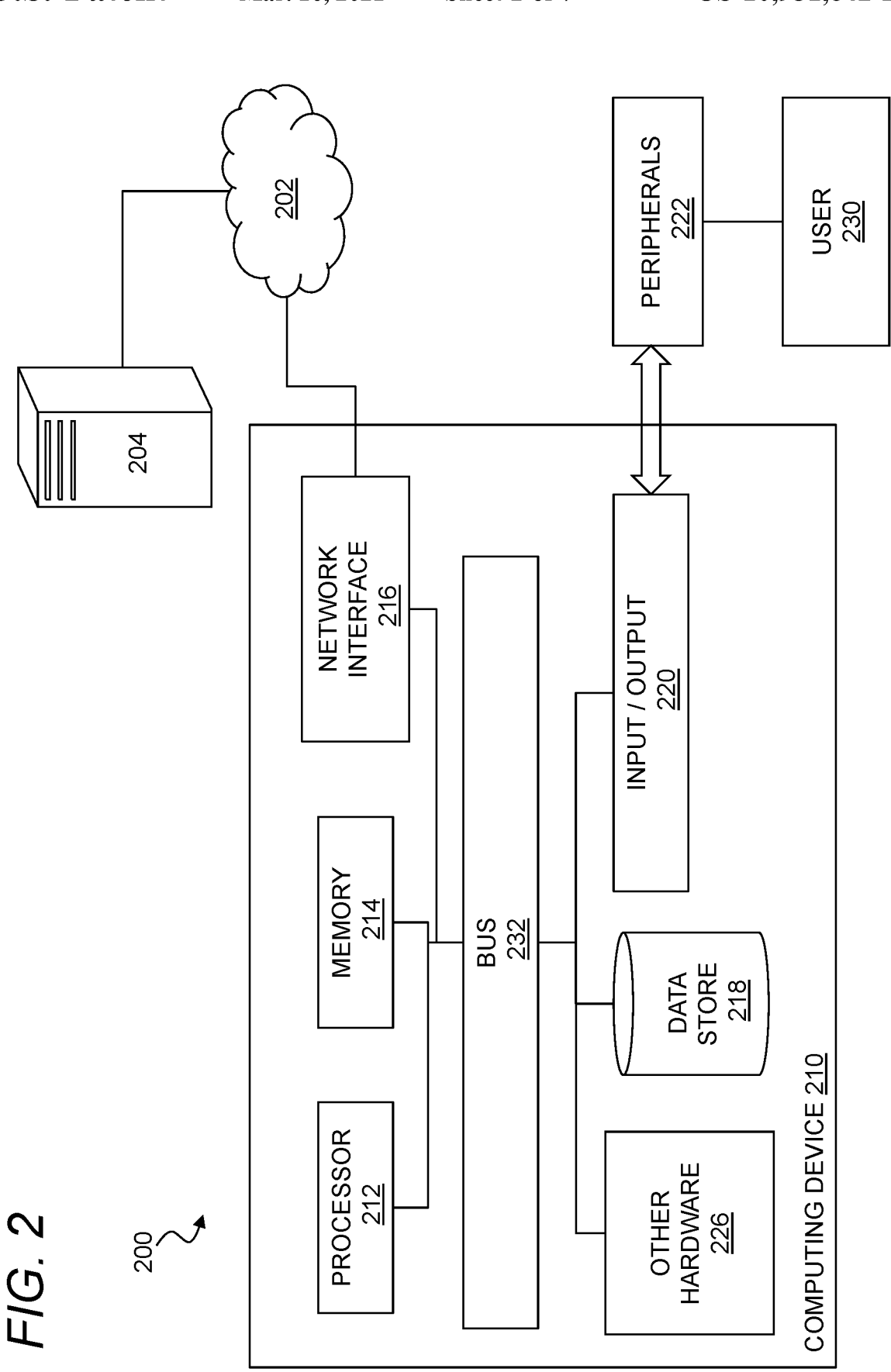
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
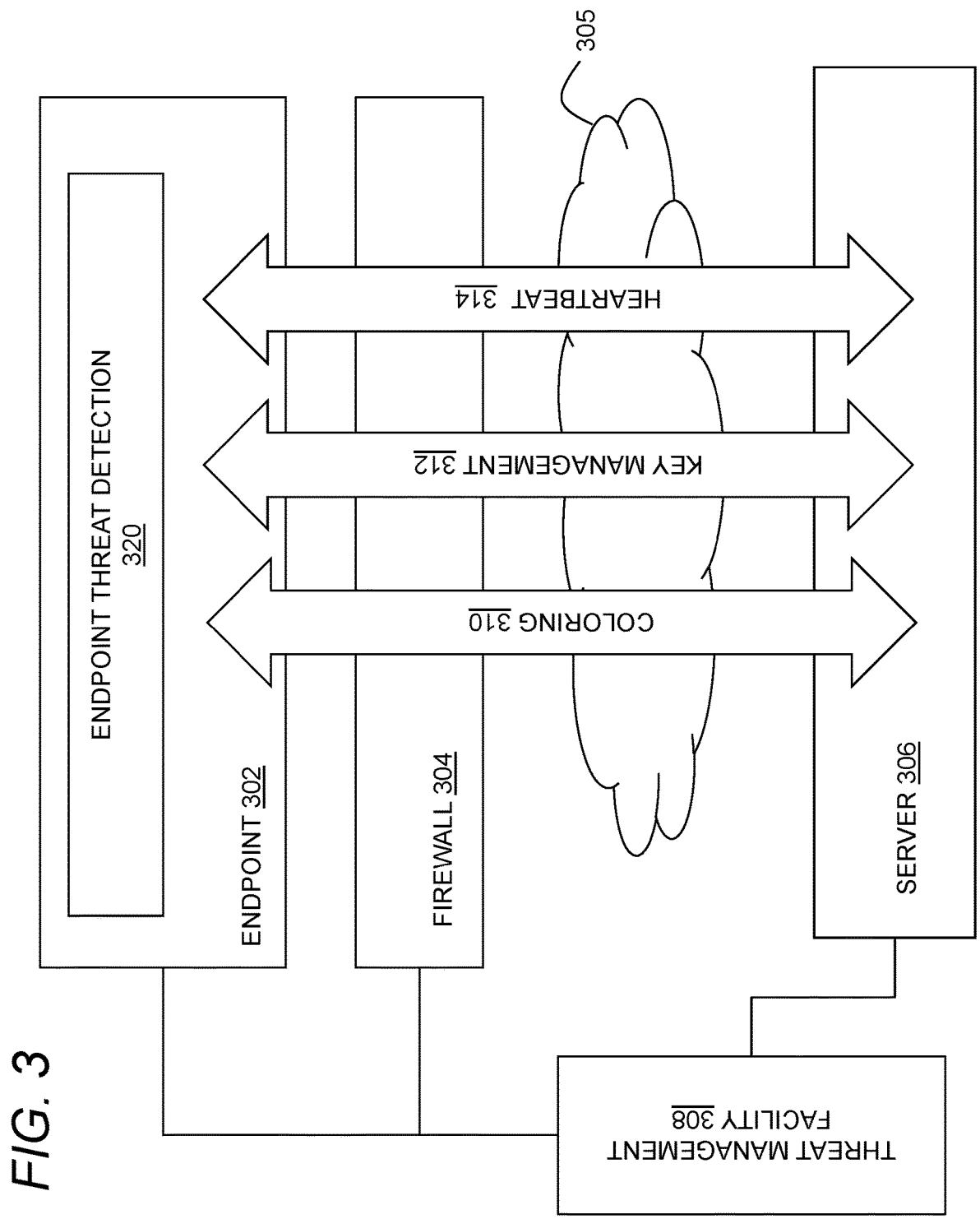
FIG. 3 illustrates a threat management system.

FIG. 3 illustrates an exemplary threat management system as contemplated herein.

In general, the system may include an endpoint 302, a firewall 304, a server 306 and a threat management facility 308 coupled to one another directly or indirectly through a data network 305, for example, as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, events, network communications, data, data sources and so forth with any suitable color. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein.

The key management system 312 may support management of keys for the endpoint 302 to selectively permit or prevent access to content on the endpoint 302, or content on a local or remote data store accessible by the endpoint 302, on a file-specific basis, a process-specific basis, an application-specific basis, a user-specific basis, or any other suitable basis to prevent data leakage, and to support more fine-grained and immediate control over access to content on the endpoint 302 when a security compromise is detected. Thus, for example, if a particular process executing on the endpoint is compromised, or potentially compromised or otherwise under suspicion, keys to that process may be revoked to prevent, e.g., data leakage or other malicious activity.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 302 to the threat management facility 308) or bidirectionally (e.g., between the endpoint 302 and the server 306, or any other pair of system components) on any useful schedule. The heartbeat 314 may usefully provide a secure communication channel between any of the endpoint 302, the firewall 304, the server 306, and the threat management facility 308. In implementations, information from the endpoint 302 may be communicated from the endpoint 302 to a firewall 304, and the information may be passed on by the firewall 304 to the server 306. The heartbeat system 314 may be used, for example, to communicate administrative, system management, system configuration, or other information in addition to health and security status information. For example, the heartbeat system 314 may be used to direct the endpoint 302 to undertake action for security purposes, such as to provide process information to the firewall 304, to stop a process running on the endpoint 302, or to delete keys used by the key management system 312. A suitable heartbeat system is described in greater detail below with reference to FIG. 4.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
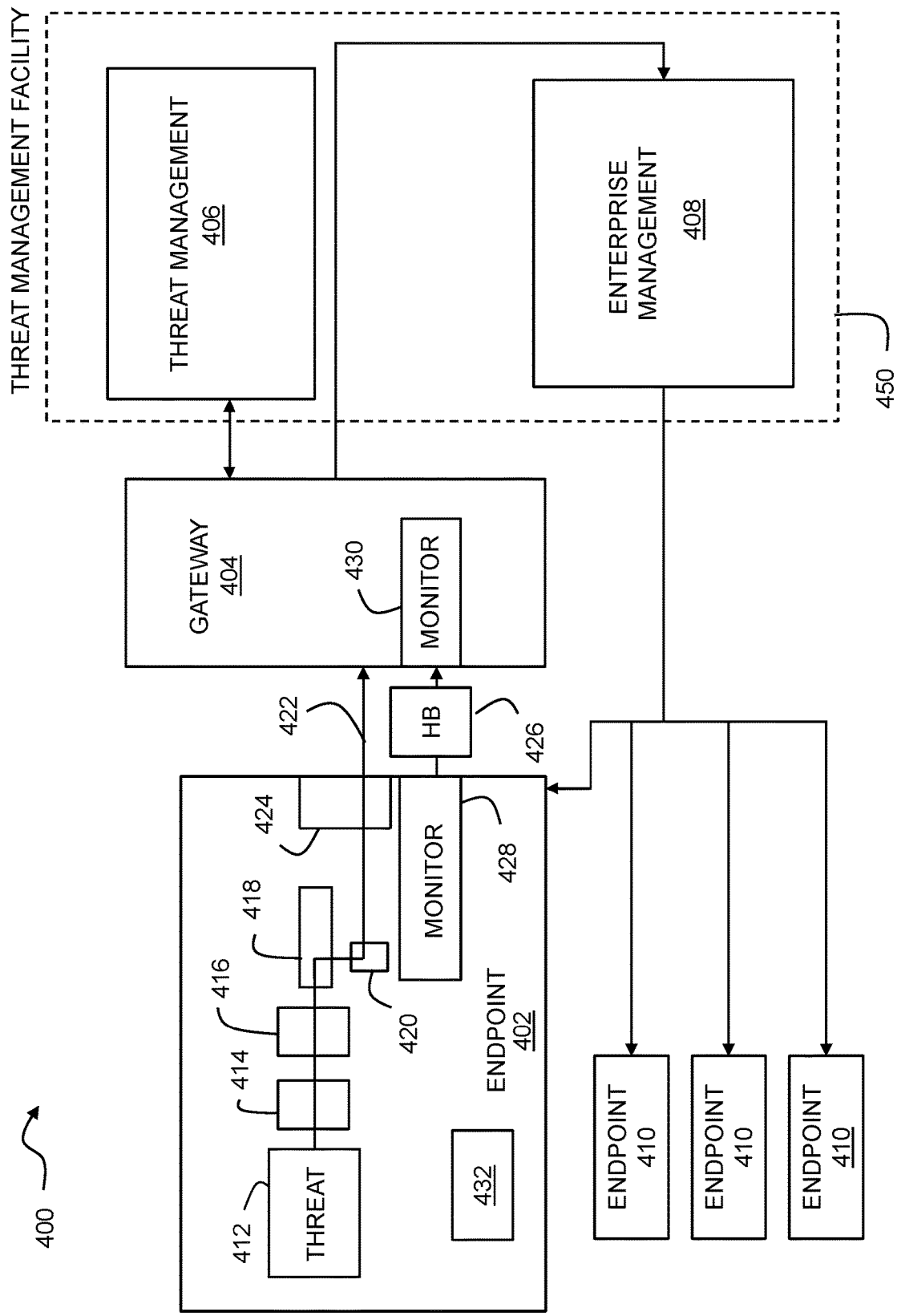
FIG. 4 illustrates a threat management system using heartbeats.

FIG. 4 illustrates a threat management system using heartbeats. In general, a system 400 may include an endpoint 402, a gateway 404, a threat management system 406, and an enterprise management system 408 that manages an enterprise including the endpoint 402, the gateway 404, and one or more additional endpoints 410. Each of these components may be configured with suitable programming to participate in the detection and remediation of threats, such as an advanced persistent threat (APT) or other malware threat as contemplated herein.

The endpoint 402 may be any of the endpoints described herein, or any other device or network asset that might join or participate in an enterprise network. The endpoint 402 may contain a threat 412 such as an advanced persistent threat, virus, or similar malware that resides on the endpoint 402. The threat 412 may have reached the endpoint 402 in a variety of ways, and may have been placed manually or automatically on the endpoint 402 by a malicious source. It will be understood that the threat 412 may take any number of forms and have any number of components. For example, the threat 412 may include an executable file that can execute independently, or the threat 412 may be a macro, plug-in, or the like that executes within another application. Similarly, the threat 412 may manifest as one or more processes or threads executing on the endpoint 402. The threat 412 may install from a file on the endpoint 402 or a file remote from the endpoint 402, and the threat 412 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 412 may be analyzed by one or more threat countermeasures on the endpoint 402 such as a whitelisting filter 414 that approves each item of code before executing on the endpoint 402 and prevents execution of non-whitelisted code. The endpoint 402 may also include an antivirus engine 416 or other malware detection software that uses any of a variety of techniques to identify malicious code by reputation or other characteristics. A runtime detection engine 418 may also monitor executing code to identify possible threats. More generally, any of a variety of threat detection techniques may be applied to the threat 412 before and during execution. In general, a threat 412 may evade these and other security measures and begin executing as a process 420 on the endpoint 402.

Network traffic 422 from the process 420 may be monitored and logged by a traffic monitor 424 on the endpoint 402. The traffic monitor 424 may, for example, log a time and a source of each network request from the endpoint 402. Where the endpoint 402 is within an enterprise network, the network traffic 422 may pass through the gateway 404 in transit to a data network such as the Internet. While the gateway 404 may be logically or physically positioned between the endpoint 402 and an external data network, it will be understood that other configurations are possible. For example, where the endpoint 402 is associated with an enterprise network but operating remotely, the endpoint 402 may form a VPN or other secure tunnel or the like to the gateway 404 for use of a threat management system 406, enterprise management system 408, and any other enterprise resources.

The gateway may be any of the gateways described herein, or any other suitable device or network asset that might serve to connect networks and protect an enterprise network. For example, a given gateway 404 may be a firewall, wireless access point, security router, or a combination. The endpoint 402 may use a heartbeat 426 to periodically and securely communicate status to the gateway 404. The heartbeat 426 may be created by a health monitor 428 within the endpoint 402, and may be transmitted to a remote health monitor 430 at the gateway 404. The health monitor 428 may monitor system health in a variety of ways, such as by checking the status of individual software items executing on the endpoint 402, checking that antivirus and other security software is up to date (e.g., with current virus definition files and so forth) and running correctly (e.g., without detections or alerts), checking the integrity of cryptographic key stores, checking for compliance with enterprise security policies, and checking any other hardware or software components of the endpoint 402 as necessary or helpful for health monitoring. The health monitor 428 may thus condition the issuance of a heartbeat 426 on a satisfactory status of the endpoint 402 according to any suitable criteria, enterprise policies, and other evaluation techniques. The heartbeat 426 may include information from the health monitor 428 regarding the health, security status, or other status of the endpoint 402.

The heartbeat 426 may be secured in any suitable manner so that the remote health monitor 430 can reliably confirm the source of the heartbeat 426 and the status of the endpoint 402. To this end, the heartbeat 426 may be cryptographically signed or secured (e.g., using a private key) so that the remote health monitor 430 can authenticate the origin of the heartbeat 426 using a corresponding key (e.g., public key). In one aspect, the heartbeat 426 may include a combination of plaintext information and encrypted information, such as where the status information for the endpoint is provided in plaintext while a digital signature for authentication is cryptographically secured. In another aspect, all of the information in the heartbeat 426 may be encrypted.

In one aspect, a key vault 432 may be provided on the endpoint to support cryptographic functions associated with a secure heartbeat. An obfuscated key vault 432 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 432, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

Robustness of the heartbeat 426 may usefully provide defensive mechanisms against reverse engineering of obfuscated content (e.g., the private key material stored in key vault 432, the code used to validate the correct running of the remainder of the systems as part of the heartbeat 426 code itself) and any anti-lifting protections to prevent malware from directly using the endpoint 402 (or the health monitor 428 on the endpoint 402) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 426 code itself.

A variety of useful techniques may be employed to improve security of the key vault 432 and the heartbeat 426. For example, the system may use domain shifting so that original key material is inferred based on hardware and software properties readily available to the key vault 432. Software properties may, for example, include readily determined system values such as hashes of nearby code. In another aspect, the keys may be domain shifted in a manner unique to the endpoint 402 so that the manner of statistical validation of call stacks and core software is unique to the endpoint 402. Further the key vault may be provisioned so that a public key stored in the key vault 432 is signed with a certificate (or into a certificate chain) that can be externally validated by a network appliance or other trusted third party or directly by the health monitor.

The heartbeat 426 may encode any useful status information, and may be transmitted from the endpoint 402 on any desired schedule including any periodic, aperiodic, random, deterministic, or other schedule. Configured in this manner, the heartbeat 426 can provide secure, tamper-resistant instrumentation for status of the endpoint 402, and in particular an indication that the endpoint 402 is online and uncompromised. A disappearance of the heartbeat 426 from the endpoint 402 may indicate that the endpoint 402 has been compromised; however, this may also simply indicate that the endpoint 402 has been powered off or intentionally disconnected from the network. Thus, other criteria may be used in addition to the disappearance or interruption of the heartbeat 426 to more accurately detect malicious software. Some such techniques are described below, but it will be understood that this may include any supplemental information that might tend to make an attack on the endpoint 402 more or less likely. For example, if the heartbeat 426 is interrupted but the endpoint 402 is still sourcing network traffic, then an inference might suitably be made that the endpoint 402 is compromised.

The heartbeat 426 also may encode any useful information to be communicated to the endpoint 402, which may be transmitted to the endpoint 402 in response to the heartbeat or otherwise. As a few examples, the heartbeat 426 may be used to direct the endpoint 402 to update files, change configuration, scan files, or undertake steps for remediation steps.

The threat management system 406 may, in general, be any of the threat management systems described herein. The enterprise management system 408 generally provides tools and interfaces for administration of the enterprise and the one or more additional endpoints 410 and other resources or assets attached thereto. It will be understood that, the functions of the threat management system 406 and the enterprise management system 408 may vary, and general threat management and administration functions may be distributed in a variety of ways between and among these and other components. This is generally indicated in FIG. 4 as a threat management facility 450 that includes the threat management system 406 and the enterprise management system 408. It will be understood that either or both of these systems may be administered by third parties on behalf of the enterprise, or managed completely within the enterprise, or some combination of these, all without departing from the scope of this disclosure. It will similarly be understood that a reference herein to a threat management facility 450 is not intended to imply any particular combination of functions or components, and shall only be understood to include such functions or components as explicitly stated in a particular context, or as necessary to provide countermeasures for advanced persistent threats as contemplated herein.

Figure 5:
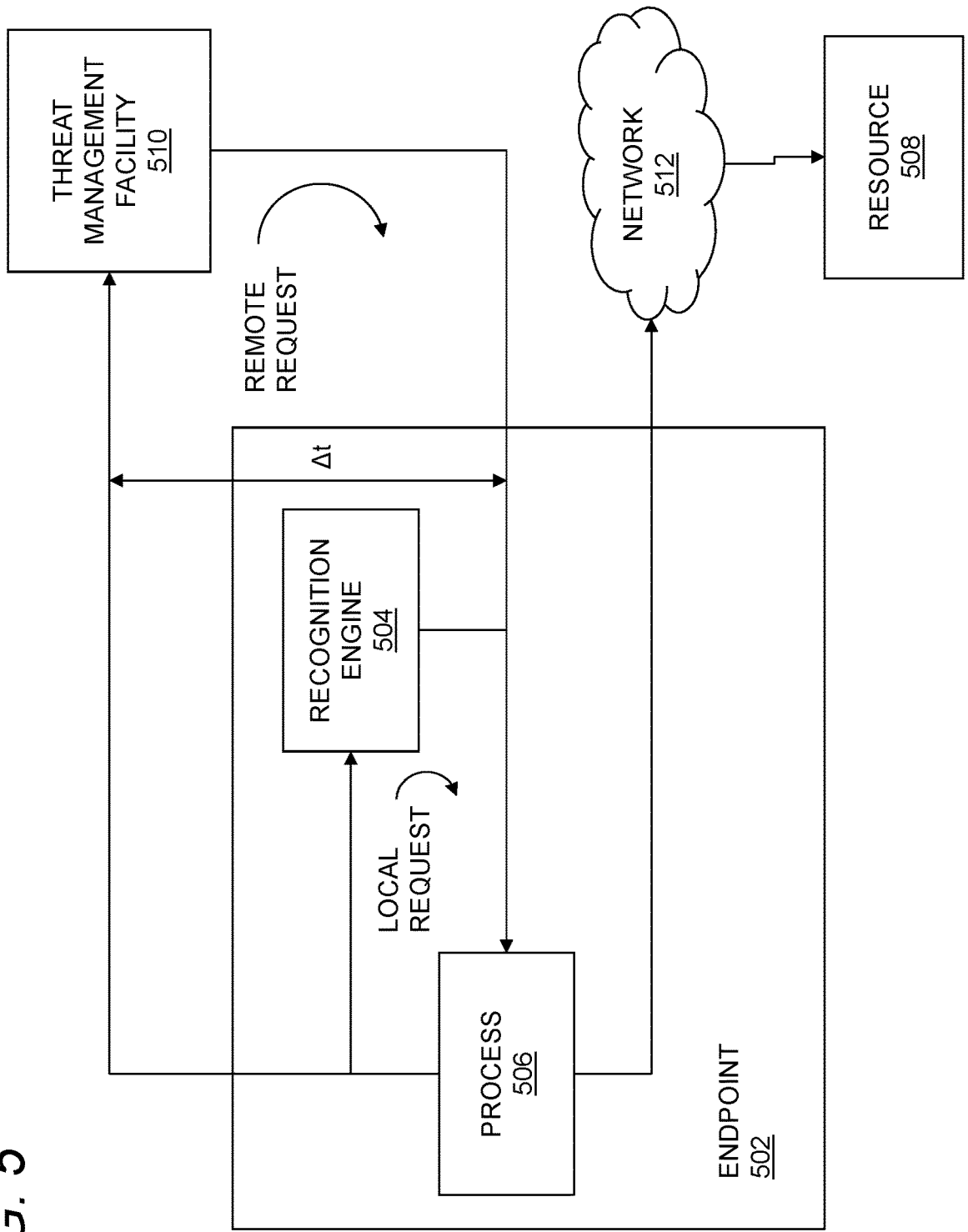
FIG. 5 illustrates an endpoint using context-dependent timeouts for remote security services.

FIG. 5 illustrates an endpoint using context-dependent timeouts for remote security services. In general, the system 500 may include an endpoint 502 such as any of the endpoints described herein. The endpoint 502 may include a recognition engine 504 that locally evaluates the reputation of a resource 508. The resource 508 may be any type of resource accessible by the endpoint 502. For example, the resource may be a resource 508 accessible over a network 512, such as any of the networks described herein, including without limitation any local network, wide area network, or combination of these. The network 512 may also or instead include local communications infrastructure such as a SATA interface, a USB interface, a USB hub, or the like coupling the endpoint 502 to local resources. Thus, in one aspect, the resource 508 may include a file on a local storage device or a service available through a web application on a local server.

In various implementations, the recognition engine 504 may determine a reputation based on the resource itself, an identifier of the resource, a value derived from the resource (e.g., a signature or signatures), a location of the resource, or any other information indicative of reputation, as well as combinations of the foregoing. A reputation may be determined, for example, by evaluating the Uniform Resource Locator associated with the remote resource 508. In another aspect, the reputation may be determined from the network address and/or characteristics of the network address, such as the age of a domain associated with the network address, an identified owner of the network address, or a public key associated with the network address. In another aspect, the reputation may be determined from one or more values derived from one or more files obtained from the resource 508, e.g., a signature of an HTML file or other content provided by the resource 508.

In a demonstrative example, the endpoint 502 may connect to the resource 508 via a network 512 such as the Internet to obtain content or remote services. In operation, before a process 506 executing on the endpoint issues a request to access the resource 508, the process 506 may request a local evaluation of reputation, e.g., of the network address of the resource 508, by the recognition engine 504, while concurrently requesting a remote evaluation of reputation by a threat management facility 510 accessible by the endpoint 502 through a network. The threat management facility 510 may generally include any of the threat management facilities described herein.

It will also be appreciated that the local request and the remote request may contain different information. For example, the local request may contain a literal network address such as a Uniform Resource Locator, while the remote request may contain other context such as the name or reputation of the process 506 requesting access to the resource 508. This approach can advantageously facilitate the use of a compact recognition engine 504 on the endpoint 502 in combination with a large, global database of reputation information and substantial processing resources on the threat management facility 510. Thus, for example, the recognition engine 504 may use a small amount of information highly correlated to reputation while the threat management facility 510 may use any number of different techniques alone or in combination to achieve more accurate assessments of reputation. Conversely, the recognition engine 504 may supply many data points to a machine learning classifier or other pattern recognition tool or the like, while the remote threat management facility 510 may advantageously support deep and up to date information about particular network addresses or the like. Thus, more generally, any technique or combination of techniques that usefully distributes processing between a local recognition engine 504 and a remote threat management facility 510 may be used as contemplated herein, particularly in configurations where the local recognition engine 504 can usefully provide a preliminary conclusion that informs how long the endpoint 502 should wait for additional reputation information from the threat management facility 510.

In this context, it should be understood that the process 506 may directly request a local evaluation of reputation, or the process 506 may request the local evaluation indirectly through a local security agent or the like. In another aspect, the local security agent may monitor operation of the process 506 and initiate such requests at appropriate times, e.g., when a process such as a browser process or other application initiates a communication to an external network address. Thus, with respect to local requests for evaluation of reputation, and with respect to other security tasks associated with a process in the following description, such tasks may be performed by the process, or by a security agent that monitors the process, or any suitable combination of these.

The recognition engine 504 may, for example, be a machine learning algorithm such as a classifier trained to evaluate reputation for resources, e.g., based on network addresses or any other useful classification feature(s). The recognition engine 504 may also or instead use a lookup table or other reputation database, pattern recognition tools, rules, neural networks, or any other processes, algorithms, or the like to locally evaluate a reputation of resources based on features such as a network address. However, rather than using this local reputation evaluation to establish a rule for accessing the resource 508, the reputation provided by the recognition engine 504 may be used to determine a timeout that establishes how long (Δt in the figure) the process 506 should wait for a response from the threat management facility 510 before resorting to a default rule for network communications that is to be used in the absence of data from the threat management facility 510. The recognition engine 504 may be deployed within, or controlled by, a security agent or other security-related process executing on the endpoint 502.

If the threat management facility 510 responds within the time limit determined based on the local reputation evaluation, then the response from the threat management facility 510 will be used, and if the threat management facility 510 does not respond within this time limit, then a local default rule will be applied. In general, the response from the threat management facility 510 may be a specific access rule, e.g., a blacklist or whitelist for the resource 508, or the response may contain reputation information, source identifiers, contextual information, and the like that can be used by the endpoint 502 to locally determine whether/how to access the resource 508. The local default rule—the rule used in the absence of a reply from the threat management facility 510—may also contain various types of sub-rule, parameters, and the like. For example, the local default rule may whitelist certain known, high-reputation network locations and prevent access to all others. Or the local default rule may permit access based on reputation information from the recognition engine 504. In one aspect, the local default rule may vary based on the reputation determined by the recognition engine 504. For example, the local default rule may permit access to sites determined by the recognition engine 504 to have a high reputation, even in the absence of a response from the threat management facility 510, but prohibit access to low reputation sites until a response from the threat management facility 510 is received, regardless of how long the response takes.

If the remote or locally-derived rule provides for access to the resource 508 by the process 506, then the process 506 may be permitted to access the resource 508 for remote services, content retrieval, and so forth. In this manner, access to remote resources can be informed by data from a global, remote threat management resource, while advantageously permitting autonomous, local decision making under suitable circumstances. More generally, local information may be used by an endpoint to control how long the endpoint will wait for a remote security service to respond to a request for information.

Figure 6:
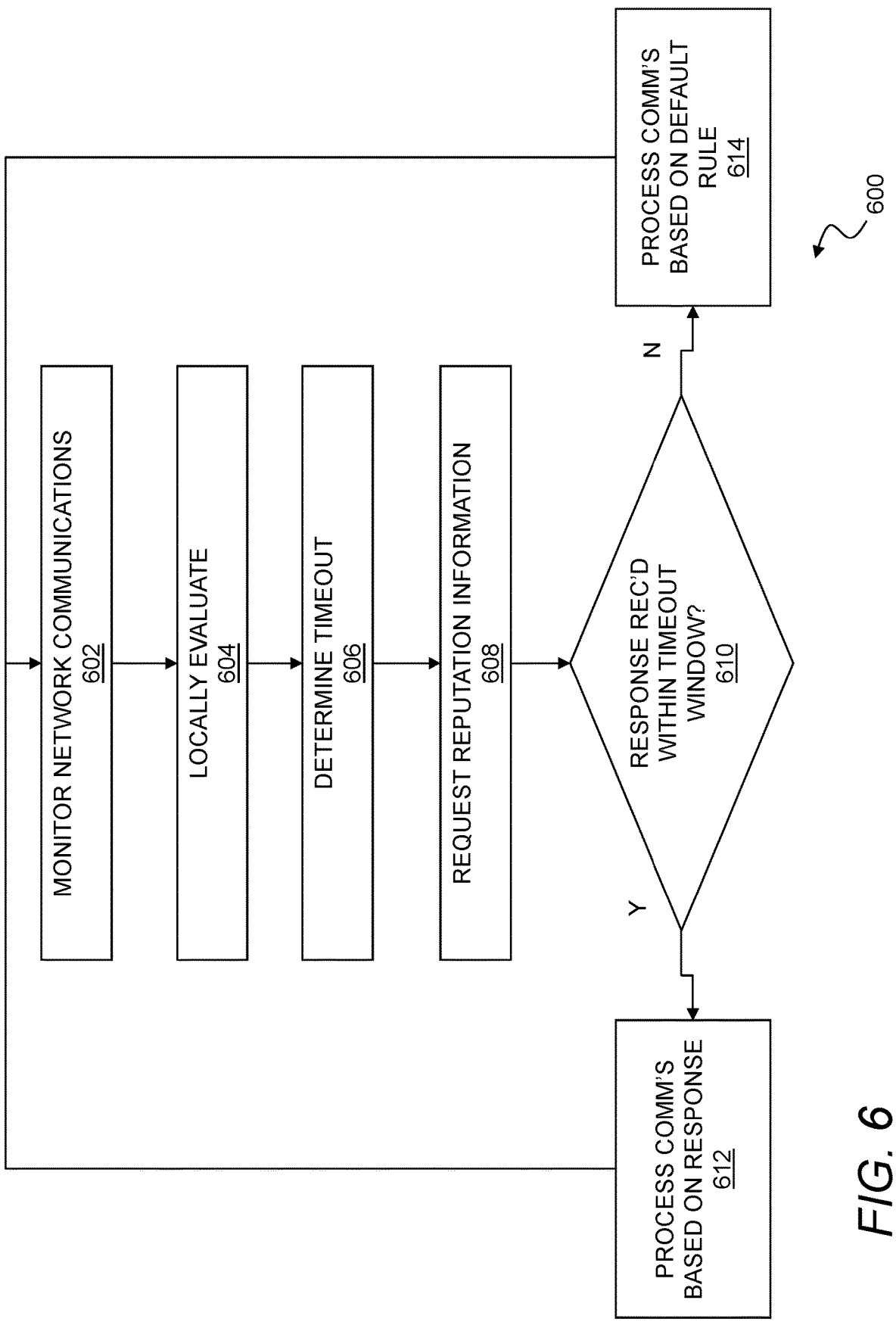
FIG. 6 illustrates a flow chart of a method for context-dependent timeouts on remote security services.

FIG. 6 illustrates a flow chart of a method for context-dependent timeouts on remote security services. In general, a threat management facility that remotely stores global reputation information and related analytical tools for network content can be used in combination with a recognition engine such as a machine learning classifier that is locally deployed on endpoints within an enterprise network. The recognition engine may locally evaluate reputation for a network resource being accessed by an endpoint, and this reputation information can be used to dynamically establish a timeout for a remote request from the endpoint to the threat management facility for corresponding global reputation information.

As shown in step 602, the method 600 may begin with monitoring network communications from an endpoint to (and optionally from) a resource, e.g., identified by a network address. For example, this may include intercepting a request for content from a browser or other process executing on the endpoint. This may also or instead include intercepting a request for content from a file system, a file server, an intranet information or services resource, and so forth. The network address may be any address or other identifier or the like that identifies a recipient for the request on a data network. For example, the network address may include a Uniform Resource Locator or Internet Protocol address. While network communications may include a request for content from a network address, which may usefully provide reputation information by itself based on the corresponding address, the monitored network communications may also or instead include content retrieved from the network address or any other context or the like associated with the network communications, any of which may be used by a local recognition engine and/or remote threat management facility to draw inferences about reputation and security.

As shown in step 604, the method 600 may include locally evaluating network communications, such as by monitoring the network address in the network communications or any other aspects of the communications that might be indicative of reputation. For example, this may include applying a machine learning classifier locally on the endpoint to estimate a risk associated with a Uniform Resource Locator, or more generally, applying a recognition engine such as any of the recognition engines described herein locally on the endpoint to estimate a risk associated with the network communications.

As shown in step 606, the method 600 may include determining a timeout for a response from a remote threat management facility to a request, such as a lookup request, from the endpoint. The timeout generally provides a window of limited duration for receiving the response at the endpoint, and the length of the timeout interval may, for example, be based on a risk determined when evaluating the network address, e.g., the risk determined by the machine learning classifier or other recognition engine or the like. In another aspect, the machine learning classifier may be trained to directly return a timeout for use by the endpoint, so that steps 604 and 606 are performed concurrently by the machine learning algorithm. In general, the risk as used herein may represent any information indicative of a threat or reputation of the network address. For example, risk may include a threat level of the network address, a known malware presence at the network address, a reputation of the network address, and so forth.

It will be appreciated that, while a timeout is a useful security parameter that may be dynamically controlled based on reputation or risk for a network address, step 606 may more generally include modifying any security parameter(s) on the endpoint in response to the risk associated with the network communications. Thus, while modifying the security parameter may include modifying a timeout for a remote request to a threat management facility for information about the network address as generally described herein, this may also or instead include adjusting firewall filters, adjusting an amount and type of content scanning, regulating bandwidth, and so forth. In another aspect, modifying the security parameter may include modifying at least one of a data rate of retrieval of the content, an amount of the content to scan for malware, and a security policy for the endpoint. In another aspect, modifying the security parameter may include at least one of selecting a sandbox to execute the content, specifying a scanning aggressiveness, and modifying a handling of the content.

As shown in step 608, the method 600 may include requesting reputation information, such as by transmitting a lookup request for the Uniform Resource Locator or other network address from the endpoint to a remote threat management facility. While the threat management facility may usefully perform a lookup in a global database or the like, the threat management facility may also or instead apply a machine learning classifier, heuristics, rules, filters, pattern recognition tools, and so forth in any suitable combination to assist with evaluating a reputation of the network address.

As shown in step 610, the method 600 may include determining whether a response was received from the threat management facility within the window provided by the timeout. This may be evaluated locally on the endpoint using any suitable time tracking techniques.

As shown in step 612, when a response is received within the window provided by the timeout, the method 600 may include processing the request for content according to the response from the remote threat management facility. The method 600 may then return to step 602 where additional monitoring may occur.

As shown in step 614, when the response is not received within the window provided by the timeout, the method 600 may include processing the request for content using a default local rule on the endpoint. The method 600 may then return to step 602 where additional monitoring may occur.

Processing the request for content (either according to the default rule in step 614 or the information received from threat management facility in step 612) may include blocking retrieval of the content by a browser or other process executing on the endpoint, or otherwise applying rules, filters, bandwidth regulators, or the like to communications with the evaluated resource. Thus, processing the request may also or instead include scanning content for malware, executing the content, executing the content in a sandbox, quarantining the content, or otherwise processing the content in a manner suitable to the default rule or the information received from the threat management facility.

According to the foregoing, a system described herein may include an endpoint security agent executing on an endpoint in an enterprise network and a threat management facility coupled in a communication relationship with the endpoint, each performing the tasks described above. The threat management facility may also or instead be configured to prioritize responses to endpoints based on the locally determined risk or reputation. Thus, in one aspect, the endpoint security agent may include a recognition engine for evaluating riskiness of a network address, and the endpoint security agent may be configured to determine a risk value for network communications of the endpoint with a resource at the network address (e.g., communications containing the network address) using the recognition engine, and to transmit the risk value and a security request for the network address to a remote resource for evaluation. In complementary fashion, the threat management facility may be configured to respond to the security request based on the risk value. For example, the threat management facility may be configured to prioritize a response to the endpoint relative to one or more other requests from one or more other endpoints based upon the risk value so that potential requests to apparently higher risk resources are addressed by the threat management facility before other pending network requests by other endpoints to other resources. The network communications also or instead may include content retrieved from the network address, and the threat management facility may adjust a scanning of the content (at the threat management facility or at the endpoint) based on the risk value. The threat management facility may also or instead be configured to adjust other scanning parameters such as by adjusting an amount of the content that is scanned, or by adjusting a size of a library used to identify malware.

Figure 7:
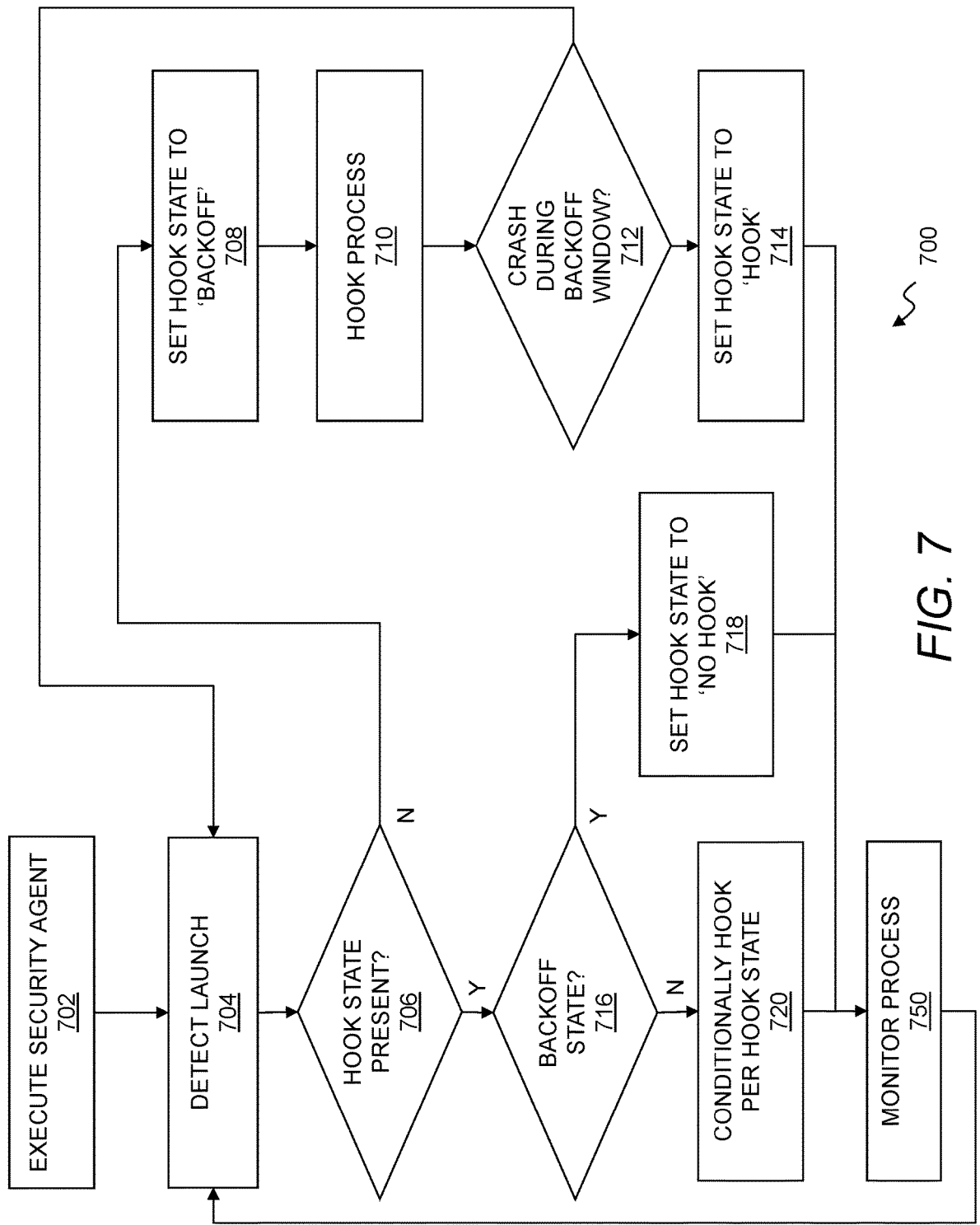
FIG. 7 illustrates a flow chart of a method for conditionally hooking endpoint processes with a security agent.

FIG. 7 illustrates a flow chart of a method for conditionally hooking endpoint processes with a security agent. In general, a process executing on an endpoint may be hooked to provide an access point for security monitoring. However, hooking into new code may be unreliable, and may cause process crashes or other unpredictable behavior. In order to facilitate hooking, a persistent hook state can be associated with processes, and used to detect when hooking causes a crash so that additional measures can be taken where necessary or appropriate. In one aspect, a security agent conditionally hooks a process for malware monitoring based on a persistent hook state for the process that may be stored, for example, in a process cache. When a process launches in a backoff state indicating that the process previously crashed after hooking, the security agent may further conditionally hook the process based on a reputation of the process or any other relevant contextual information.

As shown in step 702, the method may begin with executing a security agent on an endpoint. The security agent may be any local process or collection of processes for managing security of the endpoint, and may perform security-related tasks such as malware scanning, traffic monitoring, and so forth. In one aspect, the security agent may include at least one antimalware component configured to hook a number of processes executing on the endpoint and monitor the number of processes for malicious activity or malware.

As shown in step 704, the method 700 may include detecting a launch of a process on the endpoint, e.g., by the security agent or some other software component that reports to the security agent.

As shown in step 706, the method 700 may include determining a hooking state for the process that identifies a hooking behavior for the security agent into the process. This may, for example, include checking a process cache on the endpoint for a hooking state for the process, or otherwise retrieving locally stored, persistent information concerning a hooking state for the process. In general, the process cache may be a local cache that stores information about processes executing on the endpoint, which may be indexed, e.g., by a hash of the process name, process identifier, process code, or other process information. The process cache may be stored in any suitable location on the endpoint, and for additional security, may usefully be stored in the kernel or other reserved or protected memory space. To further secure the endpoint, the process cache may be encrypted or otherwise cryptographically protected to prevent tampering or misuse of process cache data. Thus, in one aspect, determining the hooking state may include looking up the hooking state for the process in a process cache, e.g., by retrieving the hooking state from the process cache based on a hash of the process. To this end, the method 700 may also generally include storing the process cache in a kernel for the endpoint, and/or cryptographically securing the process cache.

For the hooking state, the process cache may, for example, usefully include at least four states including no state, a backoff state, a hook state, and a no hook state. A first state, e.g., the no state, is a null state or empty state, indicating that no hooking state has previously been provided for the process. A second state may be a hook state indicating that the process should be hooked by the security agent for security monitoring when a launch of the process is detected. A third state may be a no hook state indicating that the process should not be hooked by the security agent for security monitoring when a launch of the process is detected, e.g., because the process is a known, safe process and hooking would cause the process to crash. A forth state may include a backoff state that is used to indicate that the process is being monitored for proper executing after hooking with the security agent as further described below.

As shown in step 708, where no hooking state is determined in step 706, e.g., when the process cache does not identify a hooking state, this indicates that the process has not been previously launched on the endpoint, or is otherwise new or unknown. In this case, the method 700 may include initiating a trial hooking procedure by setting the hooking state to a backoff state. This may also include setting a backoff window that establishes a predetermined interval during which a hook will be tested with the process.

As shown in step 710, the method 700 may include hooking the process for security monitoring as generally contemplated herein.

As shown in step 712, the method 700 may include determining if the hooked process crashes during the predetermined interval of the backoff state. More specifically, this may include executing the process with the hook for the predetermined interval established by the backoff state, and if the process executes without crashing, hooking the process with the security agent and proceeding to step 714, where the hooking state may be set to hook. The method 700 may then continue to step 750 where the process may be monitored with the hook. The hooking state may also be stored in the process cache so that the hooking state is available for subsequent launches of the process.

If, on the other hand, the process crashes within the predetermined interval, then the process may return to step 704 where the launch of another process may be detected. In this context, a crash should be understood to include any unexpected termination, pause, exit, or combination of these that interrupts normal or expected operation of the process. Where the process that is detected in step 704 is the process that crashed during step 712 above, then the stored hooking state for the process will be the backoff state that was set for the process, e.g., in the process cache, prior to the crash. Thus, a hooking state will be detected in step 706, and the method 700 may proceed to step 716. As shown in step 716, it may be determined whether the hooking state is a backoff state. In general, the process will only be in the backoff state at this point when the process crashed during trial hooking, e.g., in step 712 above. In this case, the process is known to crash when hooked, so the hooking state may be set to no hook in order to prevent subsequent hooking and crashing. Thus, where the hooking state is a backoff state, e.g., upon subsequently detecting the backoff state in the process cache after a process has crashed with the hook in step 712, then the method 700 may include setting the hooking state to no hook as shown in step 718.

Setting the hook state to no hook as shown in step 718 may also or instead include conditionally setting the hook state based on, e.g., the reputation of the process or any other suitable contextual information. Thus, for example, if the process recovers from a crash in the backoff state, the method 700 may also include (at step 718 or any other suitable time such as when launch is detected in step 704), evaluating a reputation of the process to determine whether the process can be safely executed within hooking by the security agent. For example, this may include retrieving reputation information for the process from a remote threat management facility. In one aspect, if the process recovers from a crash in the backoff state as described above, setting the hooking state to no hook may include conditionally setting the backoff state to no hook only if the process has a high reputation or other characteristics indicative of low security risk.

As shown in step 720, when a hooking state is determined (other than the backoff state), e.g., because the process cache identifies the hooking state, the method 700 may include conditionally hooking the process with the security agent according to the hooking state. Conditionally hooking may, for example, include hooking the process with the security agent where the hooking state is set to the hook state, and not hooking the process with the security agent when the hooking state is set to a no hook state. This may more generally include managing hooking of the process according to the hook state and any corresponding hooking rules, contextual information, other security constraints, or the like. In one aspect, the hooking state may specify from among two or more different hooking techniques so that, e.g., when a preferred hooking technique causes the process to crash, a secondary technique may be tried and used as an alternative.

It will be appreciated that other rules may usefully be employed in this step. For example, if the process has a no hook state, the process may nonetheless be executed if the process has a known, trusted origin or is otherwise of sufficiently high reputation to attenuate risks of executing the process on the endpoint. Conversely, if the process has a no hook state but the reputation is unknown (or known malicious or the like), then the process may be prevented from executing. Of course, a sufficiently disreputable or risky process may be prevented from executing regardless of risk state, and any security techniques suitable for detecting and managing such risks may be used in addition to the methods described herein for securing an endpoint against malicious code. In another aspect, the no hook state may be used to specifically indicate that a process is safe to run without hooking. In this case, when the process crashes within the predetermined interval in step 712 above, setting the hooking state to the no hook state may include setting the hooking state to the no hook state only if the process has a high reputation.

As shown in step 750, when the process has been conditionally hooked, the method 700 may include monitoring the process, either through the hook if available, or through any other suitable monitoring techniques where no hook has been set. The method 700 may then return to step 704 where launches of additional processes (or potentially, the same process) may be detected.

There is also disclosed herein an endpoint configured to apply hook states as described above. This may generally include an endpoint including a processor, a memory, a process cache stored in the memory, a process executing on the processor based on instructions in the memory, and a security agent executing on the processor based on instructions in the memory. As described above, the security agent may generally be configured to hook the process with the security agent (including launching an additional process controlled by the security agent to hook the process) when the process launches with a hook state in the process cache, to not hook the process with the security agent when the process launches with a hook state in the process cache, and to conditionally hook the process based on a reputation of the process when the process launches with a backoff state in the process cache. More generally, the security agent may manage the setting of hook states, and hooking of processes according to such hook states, all as described herein.

According to the foregoing, there is also disclosed herein a network device for managing endpoints in an enterprise network that includes a first network interface coupled to the enterprise network, a second network interface coupled to a subnet of the enterprise network, and a processor configured by computer executable code stored in a memory and executable by the processor to manage network connectivity for a plurality of endpoints coupled to the subnet. The processor may further be configured to secure the enterprise network against access by compromised endpoints by performing the steps of registering an endpoint to the enterprise network, determining a network adapter profile for the endpoint, the network adapter profile including a plurality of media access control identifiers for a plurality of network adapters used by the endpoint for network communications, detecting a compromised state of the endpoint at a threat management facility of an enterprise network, and blocking network communications by all of the network adapters in the network adapter profile at one or more firewalls of the enterprise network.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
   intercepting a network request from a process executing on an endpoint, the network request identifying a recipient for the network request on a network;
   applying a recognition engine locally on the endpoint to estimate a risk associated with the network request;
   transmitting a lookup request for the network request from the endpoint to a remote threat management facility;
   determining a timeout for a response from the remote threat management facility to the lookup request based on the risk determined by the recognition engine, the timeout providing a window of limited duration for receiving the response at the endpoint;
   when the response is received within the window provided by the timeout, processing the network request according to the response from the remote threat management facility; and
   when the response is not received within the window provided by the timeout, processing the network request using a default local rule on the endpoint.

2. The method of claim 1, the risk includes a threat level.

3. The method of claim 1, wherein the risk includes a malware presence.

4. The method of claim 1, wherein the network request includes a request from a resource identified by a network address.

5. The method of claim 4, wherein the risk includes a reputation of the network address.

6. The method of claim 5, wherein the network address includes an Internet Protocol address.

7. The method of claim 5, wherein the network address includes a Uniform Resource Locator.

8. The method of claim 1, wherein the network request includes a request for content from a resource remote from the endpoint.

9. The method of claim 1, wherein the network request includes content retrieved from a resource remote from the endpoint.

10. The method of claim 1, wherein the recognition engine includes a machine learning classifier.

11. A computer program product encoded on one or more non-transitory computer storage media, the computer program product comprising instructions that, when executed by one or more computing devices, cause the one or more computing devices to perform operations comprising:
    intercepting a network request from a process executing on an endpoint;
    applying a recognition engine locally on the endpoint to estimate a risk associated with the network request;
    transmitting a lookup request for the network request from the endpoint to a remote threat management facility;
    determining a timeout for a response from the remote threat management facility to the lookup request based on the risk, the timeout providing a window of limited duration for receiving the response at the endpoint;
    when the response is received within the window, processing the network request according to the response from the remote threat management facility; and
    when the response is not received within the window, processing the network request using a default local rule on the endpoint.

12. The computer program product of claim 11, the risk includes a threat level.

13. The computer program product of claim 11, wherein the risk includes a malware presence.

14. The computer program product of claim 11, wherein the network request includes a request from a resource identified by a network address.

15. The computer program product of claim 14, wherein the risk includes a reputation of the network address.

16. The computer program product of claim 15, wherein the network address includes an Internet Protocol address or a Uniform Resource Locator.

17. The computer program product of claim 11, wherein the network request includes a request for content from a resource remote from the endpoint.

18. The computer program product of claim 11, wherein the network request includes content retrieved from a resource remote from the endpoint.

19. The computer program product of claim 11, wherein the recognition engine includes a machine learning classifier.

20. A system comprising:
    an endpoint associated with an enterprise network, the endpoint including a computing device comprising a memory and a processor;
    an endpoint security agent executing on the processor based on instructions in the memory, the endpoint security agent including a recognition engine to estimate a risk associated with a network request, and the endpoint security agent configured to apply the recognition engine locally on the endpoint to estimate the risk associated with the network request, to transmit a lookup request for the network request from the endpoint to a threat management facility for the enterprise network, to determine a timeout for a response from the threat management facility to the lookup request based on the risk determined by the recognition engine, the timeout providing a window of limited duration for receiving the response at the endpoint, when the response is received within the window provided by the timeout, to process the network request according to the response from the threat management facility and, when the response is not received within the window, to process the network request using a default local rule on the endpoint; and the threat management facility for the enterprise network, the threat management facility coupled in a communicating relationship with the endpoint, the threat management facility configured to evaluate a reputation of a resource associated with the network request.

* * * * *